United States Patent [19]
Nagata

[11] Patent Number: 5,500,876
[45] Date of Patent: Mar. 19, 1996

[54] PHASE ERROR CANCELLER FOR QPSK SIGNALS USING UNIQUE WORD DETECTORS

[75] Inventor: Kazuyuki Nagata, Tokyo, Japan

[73] Assignee: NEC Corporation, Tokyo, Japan

[21] Appl. No.: 181,053

[22] Filed: Jan. 14, 1994

[30] Foreign Application Priority Data

Jan. 14, 1993 [JP] Japan .................................... 5-005327

[51] Int. Cl.[6] .................................................. H04L 27/22
[52] U.S. Cl. ........................... 375/332; 375/349; 329/304
[58] Field of Search ........................... 375/224, 279–281, 375/329, 332, 349; 329/304–305, 310

[56] References Cited

U.S. PATENT DOCUMENTS

| | | | |
|---|---|---|---|
| 3,736,507 | 5/1973 | Wolejsza, Jr. et al. .................. | 375/281 |
| 4,847,869 | 7/1989 | Labedz et al. .......................... | 375/331 |
| 4,993,047 | 2/1991 | Moffatt et al. .......................... | 375/261 |
| 5,025,455 | 6/1991 | Nguyen .................................... | 375/327 |
| 5,095,536 | 3/1992 | Loper ...................................... | 375/332 |
| 5,136,612 | 8/1992 | Bi ............................................ | 375/205 |

FOREIGN PATENT DOCUMENTS 2662889  6/1991  France .

*Primary Examiner*—Young T. Tse
*Attorney, Agent, or Firm*—Foley & Lardner

[57] ABSTRACT

In a circuit arrangement for correcting phase errors of P-channel and Q-channel baseband signals of a QPSK signal, input registers are provided corresponding respectively to possible bit patterns which the unique words of the P-channel and Q-channel baseband signals may assume. Each input register stores 2N bits of incoming unique words of the P- and Q-channel signals. Reference registers corresponding to the possible bit patterns are provided for individually storing 2N bits of a corresponding one of the possible bit patterns. Mismatches between the bits stored in each input register and the corresponding reference register are detected and compared with thresholds to produce a phase error correcting signal. In response, the connecting paths of the P- and Q-channel baseband signals to output terminals are controlled and bit reversals are effected on the P- and Q-channel baseband signals.

6 Claims, 2 Drawing Sheets

PHASE ERROR CANCELLER FOR QPSK SIGNALS USING UNIQUE WORD DETECTORS

BACKGROUND OF THE INVENTION

1. Field of the Invention

The present invention relates generally to satellite quadrature phase shift keyed (QPSK) transmission systems, and more specifically to phase error correction for correcting phase errors introduced to the QPSK signal during transmission.

2. Description of the Related Art

In satellite communication systems using QPSK modulation, P-channel and Q-channel unique words (or burst code words) are inserted in a preamble of each burst transmission for purposes of frame, or burst synchronization. During transmission, signals will suffer undesirable effects and as a result phase errors such as bit reversals and channel reversals can occur.

According to prior art phase error cancellers, the QPSK signal is converted to P-channel and Q-channel baseband signals, and the N bits of the P-channel unique word is compared with N bits of possible bit patterns which the transmitted P-channel unique word may assume during transmission, and mismatches are detected between them to produce a mismatch count. The mismatch count is then evaluated against thresholds to generate an error correcting signal. However, the current technique is not satisfactory for precisely correcting possible phase errors and improvement has been desired.

SUMMARY OF THE INVENTION

It is therefore an object of the present invention to provide high performance phase error correction for QPSK signals using unique words.

According to a first aspect of the present invention, there is provided a circuit arrangement for correcting phase errors of P-channel and Q-channel baseband signals of a QPSK signal, wherein each of the baseband signals contains an N-bit unique word of a predetermined bit pattern to establish burst synchronization. The circuit arrangement of the present invention comprises first and second input terminals for receiving the P- and Q-channel baseband signals, and a plurality of input storage means, or registers corresponding respectively to one half of all possible bit patterns which the unique words of the P-channel and Q-channel baseband signals may assume during transmission. Each of the input registers receives the P- and Q-channel baseband signals from the input terminals and stores 2N bits of incoming unique words of the P-channel and Q-channel baseband signals. A plurality of reference storage means, or registers are provided corresponding respectively to one half of the possible bit patterns. Each of the reference registers stores 2N bits of a corresponding one of the possible bit patterns. A plurality of error detectors are provided corresponding respectively to the input registers and reference registers. Each error detector detects mismatches between the bits stored in the corresponding input register and those stored in the corresponding reference register to produce a mismatch count. A plurality of comparator circuits are connected respectively to the error detector. Each comparator circuit compares the mismatch count of the corresponding error detector with first and second thresholds and produces a first output if the mismatch count is smaller than the first threshold or a second output if it is greater than the second threshold. An error correcting circuit, which is connected to the first and second input terminals, is responsive to the first and second outputs of the comparator circuits for coupling the P- and Q-channel baseband signals to first and second output terminals, respectively, or to the second and first output terminals, respectively, and providing bit reversals on the P- and Q-channel baseband signals.

According to a second aspect of the present invention, there is provided a circuit arrangement for correcting phase errors of P-channel and Q-channel baseband signals of a QPSK, wherein each of the baseband signals contains an N-bit unique word of a predetermined bit pattern to establish burst synchronization. The circuit arrangement comprises first and second input terminals for receiving the P- and Q-channel baseband signals and first and second output terminals. An error correcting circuit is responsive to first and second error correcting signals applied thereto for coupling P-channel and Q-channel signals to the first and second output terminals through first and second connecting paths and reversing the first and second connecting paths and providing bit reversals on the P- and Q-channel baseband signals. A switch is provided for connecting the first and second input terminals to the error correcting circuit through third and fourth connecting paths or reversing the third and fourth connecting paths to the error correcting circuit depending on the absence or presence of spectral inversion. A plurality of input registers are provided corresponding respectively to one fourth of all possible bit patterns which the unique words of the P-channel and Q-channel baseband signals may assume during transmission. Each input register receives the P- and Q-channel baseband signals from the input terminals and stores 2N bits of incoming unique words of the P-channel and Q-channel baseband signals. A plurality of reference registers are provided corresponding respectively to one fourth of the all possible bit patterns. Each reference register stores 2N bits of a corresponding one of one half of the all possible bit patterns. A plurality of error detectors are provided corresponding respectively to the input registers and the reference registers. Each error detector detects mismatches between the bits stored in the corresponding input register and those stored in the corresponding reference register and producing a mismatch count. A plurality of comparator circuits are connected respectively to the error detectors. Each comparator circuit compares the mismatch count of the corresponding error detector with first and second thresholds and produces the first error correcting signal if the mismatch count is smaller than the first threshold or the second error correcting signal if the mismatch count is greater than the second threshold.

BRIEF DESCRIPTION OF THE DRAWINGS

The present invention will be described in further detail with reference to the accompanying drawings, in which.

DETAILED DESCRIPTION

Figure 1:
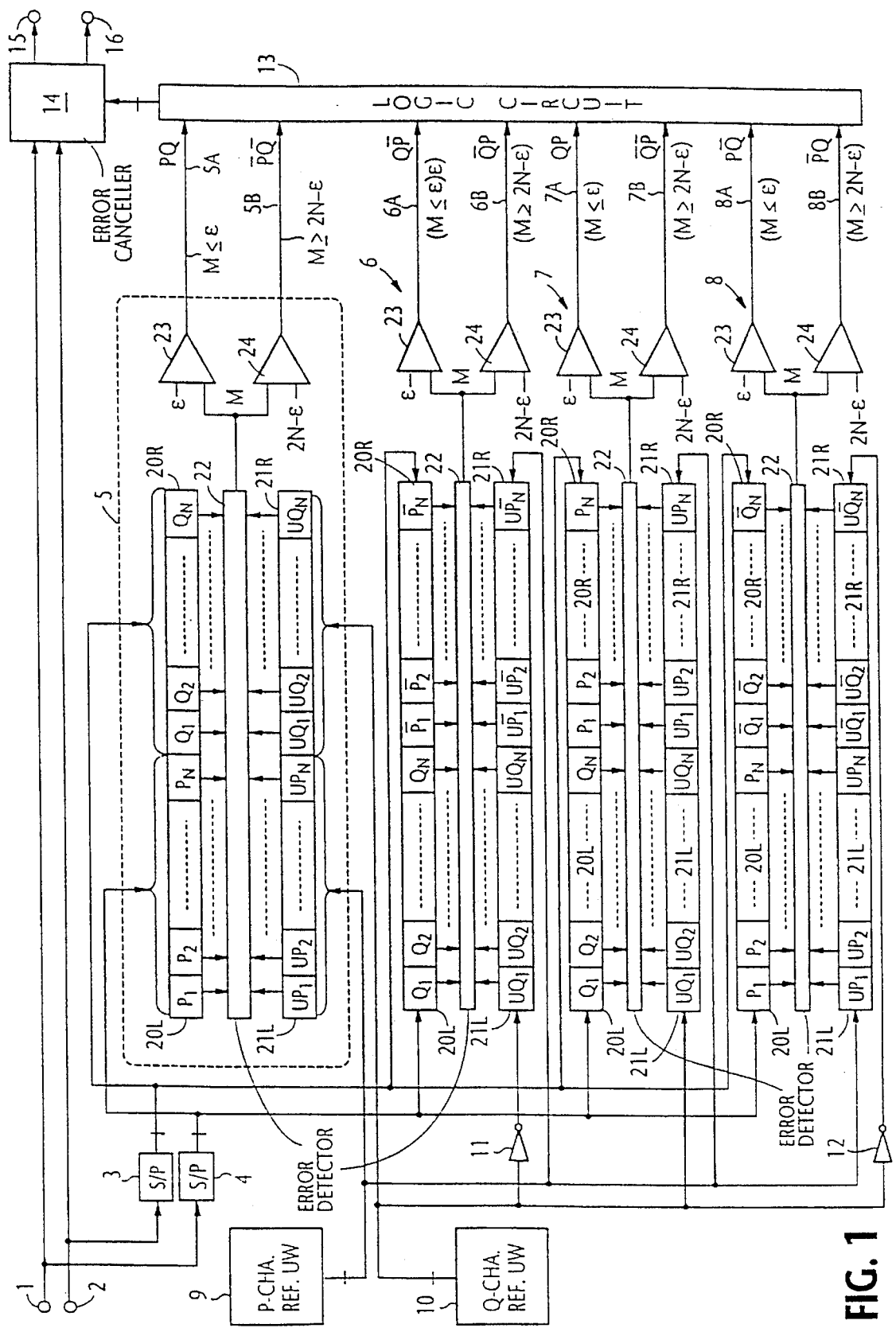
FIG. 1 is a block diagram of a unique word detector according to a preferred embodiment of the present invention.

Referring now to FIG. 1, there is shown a circuit arrangement for phase error correction according to a preferred embodiment of the present invention for receiving a QPSK (orthogonally modulated quadriphase phase shift keyed, or 4PSK) burst signal which contains a unique word (or burst code word) to establish burst synchronization. The transmitted signal is modulated into in-phase (P-channel) and quadrature (Q-channel) baseband signals by a demodulator, not shown, and applied to input terminals 1 and 2 of the phase error correction circuit arrangement, respectively. The P- and Q-channel signals are supplied to serial-to-parallel converters 3 and 4, respectively, where the N-bit serial unique words of both channels are converted to parallel data. The circuit arrangement of the present invention includes a set of four unique word detectors 5, 6, 7 and 8 of identical structure. Each of the unique word detectors 5, 6, 7 and 8 comprises a pair of N-bit input UW registers 20R and 20L and a pair of N-bit reference UW registers 21R and 21L, and a 2N-bit error detector 22 connected between the input UW registers 20R, 20L and the reference UW registers 21R, 21L. The input UW registers 20R, 20L of all unique word detectors 5, 6, 7 and 8 are connected respectively to the outputs of serial-to-parallel converters 3 and 4 to store incoming unique words of both channels, which may suffer from bit reversals and spectral inversion. The reference UW registers 21R, 21L of each unique word detector are supplied with reference unique words which correspond to possible bit patterns of the affected input unique words.

The input unique word bits are compared with the reference unique word bits of corresponding positions by error detector 22. Specifically, it comprises 2N exclusive OR gates connected respectively between corresponding bit positions of registers 20 and 21 to produce a bit "0" from each exclusive OR gate when there is a match between corresponding bit positions or a bit "1" when there is a mismatch therebetween. Therefore, error detector 22 produces an output M representative of the number of mismatches, or error count. The error count value M is applied to comparators 23 and 24 for comparison with threshold values $\epsilon$ and $2N-\epsilon$, where $\epsilon$ represents a predetermined tolerance value. If the error count M is equal to or smaller than the tolerance value $\epsilon$, comparator 23 produces a logic "1" at an output terminal 5A to indicate that the incoming QPSK signal has a particular signaling phase. If the error count M is equal to or greater than $2N-\epsilon$, comparator 24 produces a logic "1" at an output terminal 5B to indicate that the incoming QPSK signal has a signaling phase which is opposite to the signaling phase indicated at the output terminal 5A.

For generating the reference unique words in parallel form, a P-channel reference unique word generator 9 and a Q-channel reference unique word generator 10 are provided. These reference unique word generators are implemented with registers for storing predetermined bits.

Figure 2A:
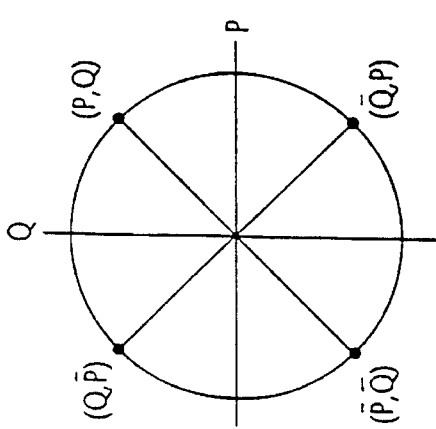
FIG. 2A is a phasor diagram of a QPSK system when no spectral inversion occurs.

The reference registers 21L and 21R of unique word detector 5 are connected to the outputs of P-channel UW generator 9 and Q-channel UW generator 10, respectively, to store P-channel reference unique word bits $UP_1, UP_2, \ldots, UP_N$ into register 21L of UW detector 5 and Q-channel reference unique word bits $UQ_1, UQ_2, \ldots UQ_N$ into register 21R of UW detector 5. If the incoming bit stream is not seriously affected by bit reversals or spectral inversion, P-channel unique word bits $P_1, P_2, \ldots, P_N$ will be stored in the input register 20L of detector 5 and Q-channel unit word bits $Q_1, Q_2, \ldots, Q_N$ will be stored in the input register 20R of detector 5 as illustrated in FIG. 1. If, as a result of bit-by-bit comparisons between the unique word bits stored in the registers of detector 5, the error count M is smaller than the tolerance value $\epsilon$, and hence a logic-1 is produced by comparator 23 at an output terminal 5A, it indicates that the received QPSK signal has a signaling phase (P, Q) at $\pi/4$ radian in the normal phasor diagram of the QPSK system, as shown in FIG. 2A, when no spectral inversion occurs. If the error count M is equal to or greater than $2N-\epsilon$, comparator 24 produces a logic "1" at an output terminal 5B, indicating that the QPSK signal has a signaling phase $(\bar{P}, \bar{Q})$ at $-3\pi/4$ radian in the normal phasor diagram.

The reference register 21L of unique word detector 6 is connected to receive the outputs of Q-channel UW generator 10 via an inverter 11 and the reference register 21R of detector 6 is connected to receive the output of P-channel UW generator 9 to store Q-channel reference unique word bits $\overline{UQ}_1, \overline{UQ}_2, \ldots, \overline{UQ}_N$ into the register 21L of detector 6 and P-channel reference unique word bits $UP_1, UP_2, \ldots, UP_N$ into the register 21R of detector 6. If the incoming bit stream is so affected that Q-channel unique word bits $\bar{Q}_1, \bar{Q}_2, \ldots, \bar{Q}_N$ are stored in the input register 20L of detector 6 and P-channel unit word bits $P_1, P_2, \ldots, P_N$ are stored into the input register 20R of this detector as illustrated, and if the error count M of detector 6 is smaller than the tolerance value $\epsilon$, a logic-1 will be produced at an output terminal 6A, indicating that the received QPSK signal has a signaling phase $(\bar{Q},P)$ at $3\pi/4$ radian in the normal phasor diagram of the QPSK system (FIG. 2A). If the error count M is equal to or greater than $2N-\epsilon$, a logic "1" will be produced at an output terminal 6B, indicating that the QPSK signal has a signaling phase $(Q,\bar{P})$ at $-\pi/4$ radian in the normal phasor diagram.

The reference register 21L unique word detector 7 is connected to receive the outputs of Q-channel UW generator 10 and the reference register 21R of detector 7 is connected to receive the output of P-channel UW generator 9 to store Q-channel reference unique word bits $UQ_1, UQ_2, \ldots, UQ_N$ into the register 21L of detector 7 and P-channel reference unique word bits $UP_1, UP_2, \ldots, UP_N$ into the register 21R of detector 7. If the incoming bit stream is so affected that Q-channel unique word bits $Q_1, Q_2, \ldots, Q_N$ are stored in the input register 20L of detector 7 and P-channel unit word bits $P_1, P_2, \ldots, P_N$ are stored into the input register 20R of detector 7 as illustrated, and if the error count M of detector 7 is smaller than the tolerance value $\epsilon$, a logic-1 will be produced at an output terminal 7A, indicating that the received QPSK signal has a signaling phase (Q, P) at $\pi/4$ radian in the inverted phasor diagram of the QPSK system which occurs when the system experiences spectral inversion (see FIG. 2B). If the error count M is equal to or greater than $2N-\epsilon$, a logic "1" is produced at an output terminal 7B, indicating that the QPSK signal has a signaling phase $(\bar{Q},\bar{P})$ at $-3\pi/4$ radian in the inverted phasor diagram.

Figure 2B:
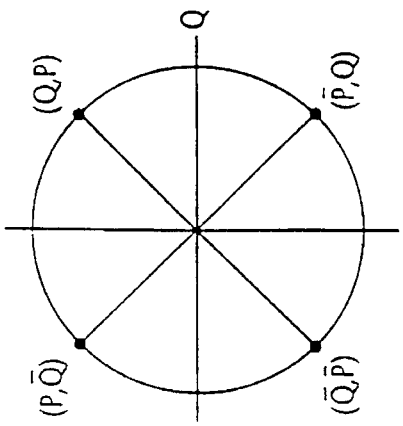
FIG. 2B is a phasor diagram of the system during spectral inversion.

The reference register 21L unique word detector 8 is connected to receive the outputs of P-channel UW generator 9 and the reference register 21R of detector 8 is connected to receive the output of Q-channel UW generator 10 via an inverter 12 to store P-channel reference unique word bits $UP_1, UP_2, \ldots, UP_N$ into the register 21L of detector 8 and Q-channel reference unique word bits $(\overline{UQ}_1, \overline{UQ}_2, \ldots, \overline{UQ}_N)$ into the register 21R of detector 8. If the incoming bit stream is so affected that P-channel unique word bits $P_1, P_2, \ldots, P_N$ are stored in the input register 20L of detector 8 and Q-channel unit word bits $(\bar{Q}_1, \bar{Q}_2, \ldots, \bar{Q}_N)$ are stored into the input register 20R of detector 8 as illustrated. If the error count M of detector 8 is smaller than the tolerance value $\epsilon$, a logic-1 will be produced at an output terminal 8A, indicating that the received QPSK signal has a signaling phase (P, Q) at 3π/4 radian in the inverted phasor diagram (FIG. 2B). If the error count M is equal to or greater than 2N–ε, a logic "1" is produced at an output terminal 8B, indicating that the QPSK signal has a signaling phase (P̄, Q) at –π/4 radian in the inverted phasor diagram.

Since the QPSK signal exclusively assumes one of the eight possible signaling phases, the eight outputs of unique word detectors 5, 6, 7 and 8 are converted to a 3-bit code by a logic circuit 13 and fed to a phase error canceller 14 as a phase correcting signal where the P- and Q-channel baseband signals are applied. Using the 3-bit code, the phase error corrector 14 provides bit reversals and channel reversals on the incoming P-channel and Q-channel signals so that their phase ambiguities are corrected at output terminals 15, 16.

Figure 3:
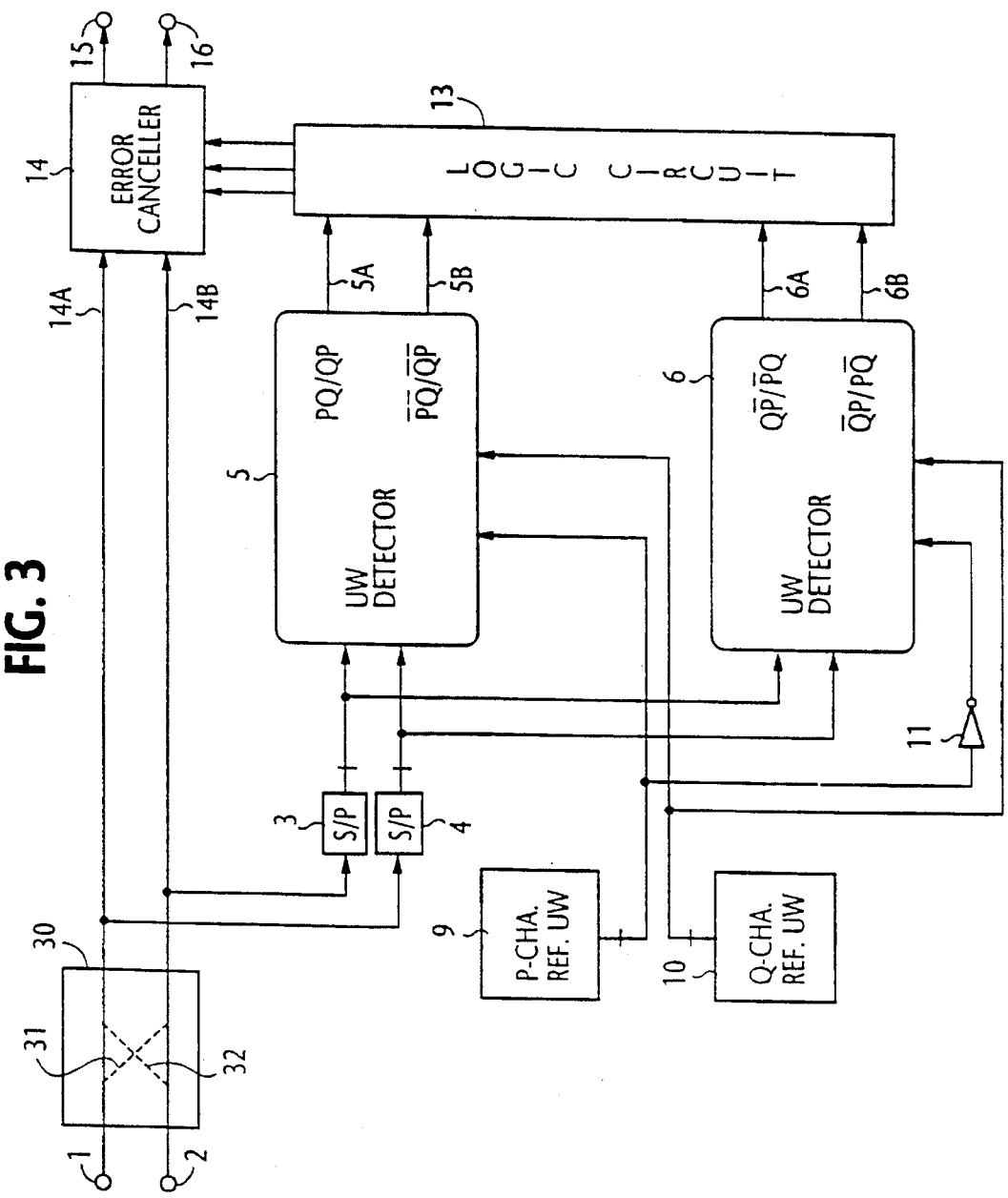
FIG. 3 is a block diagram of a unique word detector according to a modified embodiment of the present invention.

Since the occurrence of spectral inversion can be known in advance depending on the system used and it never occurs during the operation of a system, the embodiment of FIG. 1 can be significantly simplified as shown in FIG. 3 in which parts corresponding to those in FIG. 1 are marked with the same numerals as used in FIG. 1 and have the same significance as the corresponding parts of FIG. 1. The embodiment of FIG. 3 differs from the previous embodiment in that unique word detectors 7 and 8 are dispensed with, and instead, a reversal switch 30 is connected between the input terminals 1, 2 and the error canceller 14.

When spectral inversion is not expected, switch 30 is positioned to connect the input terminals 1 and 2 to the input terminals 14A and 14B of error canceller 14, respectively, as well as to the serial-to-parallel converters 3 and 4, respectively. The operation of the unique word detectors 5 and 6 are the same as described above in connection with the phasor diagram of FIG. 2A, producing logic-1 outputs indicating signaling phases (P, Q), (P̄, Q̄), (Q, P̄) and (Q̄, P).

When spectral inversion is expected, switch 30 is operated to reverse the connecting paths as indicated by numerals 31 and 32, so that the input terminals 1 and 2 are connected to the input terminals 14B and 14A of error canceller 14 and to the serial-to-parallel converters 4 and 3, respectively. The operation of the unique word detectors 5 and 6 are the same as described above in connection with the phasor diagram of FIG. 2B, producing logic-1 outputs indicating signaling phases (Q, P), (Q̄, P̄), (P̄, Q) and (P, Q̄). For example, if a logic-1 is produced at output terminal 5A, the signaling phase is (P, Q) if the switch 30 is in the normal position and (Q, P) if it is operated to reverse the connecting paths during spectral inversion.

In an alternative embodiment, since the reference unique words remain constant, the unique word generators 9 and 10 can be dispensed with by permanently storing the reference unique words as illustrated in FIG. 1.

While mention has been made of a 4PSK signal, the present invention could equally be as well applied to other PSK signals.

What is claimed is:

1. A circuit arrangement for correcting phase errors of P-channel and Q-channel baseband signals of a quadrature phase shift keyed signal, wherein each of said baseband signals contains an N-bit unique word of a predetermined bit pattern to establish burst synchronization, wherein N is an integer greater than 1, the circuit arrangement comprising:

first and second input terminals for receiving said P- and Q-channel baseband signals, respectively;

a plurality of input storage means corresponding respectively to one half of all possible bit patterns of 2N bits each, which the unique words of said P-channel and Q-channel baseband signals may assume during transmissions, each of the input storage means having 2N bit positions for storing 2N bits of incoming unique words of the P-channel and Q-channel baseband signals from said input terminals;

a plurality of reference storage means corresponding respectively to said one half of said all possible bit patterns, each of the reference storage means having 2N bit positions for storing 2N bits of the corresponding possible bit pattern patterns;

a plurality of error detector means corresponding respectively to the input storage means and the reference storage means, each of the error detector means detecting mismatches between the bits stored in the corresponding input storage means and the bits stored in the corresponding reference storage means and producing a mismatch count;

a plurality of comparator means corresponding respectively to said error detector means, each of the comparator means comparing the mismatch count of the corresponding error detector means with first and second thresholds and producing a first output signal if the mismatch count is determined to be smaller than the first threshold or a second output signal if the mismatch count is determined to be greater than the second threshold; and error correcting means responsive to the first and second output signals of said plurality of comparator means for providing channel reversals and bit reversals on the received P- and Q-channel baseband signals.

2. The circuit arrangement as claimed in claim 1, wherein said second threshold value is equal to 2N–ε, where ε is the first threshold.

3. The circuit arrangement as claimed in claim 1, wherein said error correcting means includes means for converting each of said first and second output signals of said plurality of comparator means into a multi-bit code.

4. A circuit arrangement for correcting phase errors of P-channel and Q-channel baseband signals of a quadrature phase shift keyed signal, wherein each of said baseband signals contains an N-bit unique word of a predetermined bit pattern to establish burst synchronization, wherein N is an integer greater than 1, the circuit arrangement comprising:

first and second input terminals for receiving said P- and Q-channel baseband signals, respectively;

first and second output terminals;

error correcting means responsive to first and second error correcting signals for providing channel reversals and bit reversals on the received P- and Q-channel baseband signals;

switch means for coupling said first and second input terminals to said error correcting means through first and second connecting paths and reversing the first and second connecting paths depending on absence or presence of spectral inversion;

a plurality of input storage means corresponding respectively to one fourth of all possible bit patterns of 2N bits each, which the unique words of said P-channel and Q-channel baseband signals may assume during transmission, each of the input storage means having 2N bit positions for storing 2N bits of incoming unique words of the P-channel and Q-channel baseband signals from said switch means;

a plurality of reference storage means corresponding respectively to one fourth of said all possible bit patterns, each of the reference storage means having 2N bit positions for storing 2N bits of the corresponding possible bit pattern;

a plurality of error detector means corresponding respectively to the input storage means and the reference storage means, each of the error detector means detecting mismatches between the bits stored in the corresponding input storage means and the bits stored in the corresponding reference storage means and producing a mismatch count; and a plurality of comparator means corresponding respectively to said error detector means, each of the comparator means comparing the mismatch count of the corresponding error detector means with first and second thresholds and producing said first error correcting signal if the mismatch count is determined to be smaller than the first threshold or producing said second error correcting signal if the mismatch count is determined to be greater than the second threshold and applying said first and second error correcting signals to said error correcting means.

5. The circuit arrangement as claimed in claim 4, wherein said second threshold value is equal to $2N-\epsilon$, where $\epsilon$ is the first threshold.

6. The circuit arrangement as claimed in claim 4, wherein said error correcting means includes means for converting each of said first and second output signals of said plurality of comparator means into a multi-bit code.

* * * * *